US008553097B2

(12) United States Patent
Ishii et al.

(10) Patent No.: US 8,553,097 B2
(45) Date of Patent: Oct. 8, 2013

(54) REDUCING BLUR BASED ON A KERNEL ESTIMATION OF AN IMAGING DEVICE

(75) Inventors: Yasunori Ishii, Osaka (JP); Yusuke Monobe, Kyoto (JP)

(73) Assignee: Panasonic Corporation, Osaka (JP)

( * ) Notice: Subject to any disclaimer, the term of this patent is extended or adjusted under 35 U.S.C. 154(b) by 9 days.

(21) Appl. No.: 13/379,397

(22) PCT Filed: Jan. 27, 2011

(86) PCT No.: PCT/JP2011/000445
§ 371 (c)(1),
(2), (4) Date: Dec. 20, 2011

(87) PCT Pub. No.: WO2011/135761
PCT Pub. Date: Nov. 3, 2011

(65) Prior Publication Data
US 2012/0105658 A1    May 3, 2012

(30) Foreign Application Priority Data

Apr. 30, 2010    (JP) .................................. 2010-104889

(51) Int. Cl.
*H04N 5/228*    (2006.01)
(52) U.S. Cl.
USPC ..................................... 348/208.6; 348/208.4
(58) Field of Classification Search
USPC ..................... 348/208.94, 208.13, 222.1, 154,
348/252, 253, 208.99, 208.1, 208.4, 208.5,
348/208.6; 382/274, 225; 375/240
See application file for complete search history.

(56) References Cited

U.S. PATENT DOCUMENTS 7,477,802 B2 *   1/2009   Milanfar et al. .............. 382/299
2006/0093233 A1 *   5/2006   Kano et al. .................... 382/254
(Continued)

FOREIGN PATENT DOCUMENTS

| JP | 09-062837 A | 3/1997 |
| JP | 2006-129236 A | 5/2006 |
| JP | 2009-522825 T | 6/2009 |

OTHER PUBLICATIONS

International Search Report for corresponding International Application No. PCT/JP2011/000445 mailed Mar. 8, 2011.

(Continued)

*Primary Examiner* — Tuan Ho
*Assistant Examiner* — Chan Nguyen
(74) *Attorney, Agent, or Firm* — Renner, Otto, Boisselle & Sklar, LLP

(57) ABSTRACT

A kernel estimation section (222) of an image processing device of the present invention is configured such that, when performing estimation of a blur kernel based on a contracted degraded image that has a first resolution, the kernel estimation section performs the estimation based on an initial value of a blur kernel that has a resolution corresponding to the first resolution. Thereafter, when performing estimation of a blur kernel based on a contracted degraded image that has a second resolution that is higher than the first resolution, the kernel estimation section performs the estimation based on an initial value of a blur kernel that has a resolution corresponding to the second resolution. The kernel enlargement section (223) extracts interest points of a blur kernel received from the kernel estimation section 222 (S16), performs an enlargement transformation on coordinates of the interest points (S18), and connects new interest points obtained by performing the enlargement transformation on the coordinates of the interest points (S20), thereby generating an initial value of a blur kernel that has an increased resolution (S22).

6 Claims, 11 Drawing Sheets

(56) References Cited

U.S. PATENT DOCUMENTS

| | | |
|---|---|---|
| 2007/0258706 A1 | 11/2007 | Raskar et al. |
| 2010/0329582 A1* | 12/2010 | Albu et al. .................... 382/255 |
| 2011/0115934 A1* | 5/2011 | Wang .......................... 348/222.1 |
| 2012/0300122 A1* | 11/2012 | Liu ............................... 348/441 |

OTHER PUBLICATIONS

Fergus et al., "Removing Camera Shake from a Single Photograph", Barun Singh Aaron Hertzmann, SIGGRAPH 2006, pp. 787-794.

* cited by examiner

| 0 | 0 | 0 |
|---|---|---|
| 0.2 | 0.4 | 0.4 |
| 0 | 0 | 0 |

(b)

| 15 | 17 | 20 | 16 | 14 |
|---|---|---|---|---|
| 18 | 19 | 21 | 18 | 17 |
| 21 | 20 | 25 | 21 | 19 |
| 24 | 22 | 24 | 22 | 20 |
| 27 | 25 | 22 | 21 | 20 |

FIG.2A

| 15 | 17 | 20 | 16 | 14 |
|---|---|---|---|---|
| 18 | 19 | 21 | 18 | 17 |
| 21 | 20 | 25 | 21 | 19 |
| 24 | 22 | 24 | 22 | 20 |
| 27 | 25 | 22 | 21 | 20 |

$*$

| 0 | 0 | 0 |
|---|---|---|
| 0.2 | 0.4 | 0.4 |
| 0 | 0 | 0 |

$=$ (result with 19.6)

FIG.2B

| 15 | 17 | 20 | 16 | 14 |
|---|---|---|---|---|
| 18 | 19 | 21 | 18 | 17 |
| 21 | 20 | 25 | 21 | 19 |
| 24 | 22 | 24 | 22 | 20 |
| 27 | 25 | 22 | 21 | 20 |

$*$

| 0 | 0 | 0 |
|---|---|---|
| 0.2 | 0.4 | 0.4 |
| 0 | 0 | 0 |

$=$ (result with 19.4)

(a)

IMAGE EXPANSION (b)

(a)

(b)

COORDINATES OF INTEREST POINTS :
(2, 1)、(3, 1)、(3, 3)
(5, 3)、(5, 5)

(c)

COORDINATES OF INTEREST POINTS
AFTER COORDINATE TRANSFORMATION :
(2, 1)、(4, 1)、(4, 4)
(6, 4)、(6, 6)

(d)

REDUCING BLUR BASED ON A KERNEL ESTIMATION OF AN IMAGING DEVICE

TECHNICAL FIELD

The present invention relates to an image processing device and method for reducing blur in an image that has blur caused by camera shake. The present invention also relates to an image capture device that includes the image processing device.

BACKGROUND ART

In the case of obtaining (capturing) an image by a digital camera, noise may sometimes be added to the image due to the characteristics of a CCD (Charge-Coupled Device) or a readout circuit for CMOS or the characteristics of transmission paths. Also, blur of an image due to an out-of-focus condition in capturing of the image or blur of an image due to camera shake occurs. In this way, the captured image has blur that is attributed to user's handling of the camera in photographing in addition to the noise that is attributed to the specific characteristics of the captured image, so that the image is degraded. Among such "blur" types, blur of an image that is attributed to a motion of a camera during photographing (exposure) is sometimes referred to as "motion blur".

In recent years, especially, demand for high sensitive photography is increasing, and therefore, it is necessary to restore an image degraded by blur (hereinafter, "degraded image") to an image that is as close to an original image (hereinafter, "ideal image") as possible. To realize a bright image that is free from noise or blur, such as an image demanded in high sensitive photography, the solutions are generally divided into two ideas, increasing the sensitivity and extending the exposure time.

However, increasing the sensitivity disadvantageously leads to amplification of noise. As a result, a signal is buried in the noise so that, in many cases, large part of a resultant image is formed by the noise. On the other hand, extending the exposure time enables accumulation of a larger amount of light that occurs at that site, resulting in an image that includes smaller noise. In this case, a signal would not be buried in the noise, but there is a problem of generation of motion blur in an image due to camera shake.

According to the prior art, there are two countermeasures against the problem resulting from the extended exposure time. One is optical camera shake compensation, such as lens shift, sensor shift, or the like. The other one is obtaining the direction/magnitude of motion blur from a resultant image or through a sensor and performing signal processing based on the obtained direction/magnitude of the blur to restore the image (a restoration method based on signal processing). The restoration method based on signal processing is, for example, disclosed in Patent Document 1, Patent Document 2, and Non-patent Document 1.

Hereinafter, the restoration method based on signal processing is described.

Here, the brightness distribution of an image formed on an imaging area of the image capture device is expressed by $I(x,y)$. The coordinates $(x,y)$ are two-dimensional coordinates that are indicative of the position of a pixel (photosensitive cell) on the imaging area. In the case of an image formed by, for example, M×N pixels that are arranged in rows and columns, assuming that x and y are integers that satisfy the relationships of $0 \leq x \leq M-1$ and $0 \leq y \leq N-1$, respectively, the position of each one of the pixels that form the image can be specified by the coordinates $(x,y)$. Here, it is assumed that the origin of the coordinate system, $(0,0)$, is at the left upper corner of the image. The x axis extends in a vertical direction. The y axis extends in a horizontal direction. Note that the arrangement of the coordinates is arbitrary.

Where the brightness distribution of an unblurred image (ideal image or original image) is $L(x,y)$, the PSF (Point Spread Function) that defines the blur is $PSF(x,y)$, and noise is $n(x,y)$, Formula 1 shown below holds:

[Expression 1]

$$I(x,y) = PSF(x,y) * L(x,y) + n(x,y) \quad \text{(Formula 1)}$$

Here, symbol "*" means two-dimensional convolution.

The point spread function $PSF(x,y)$ of camera shake depends on the trajectory of the camera shake during photographing (exposure). The trajectory of the camera shake varies among shots of photography with a camera, so that $PSF(x,y)$ also varies among shots of photography with a camera.

The trajectory of the camera shake during photographing may be detected by a gyro sensor, or the like. When $PSF(x,y)$ is known, deconvolution is performed using this $PSF(x,y)$, whereby the image $L(x,y)$ can be restored based on the degraded image $I(x,y)$. On the other hand, when $PSF(x,y)$ is unknown, it is necessary to estimate $PSF(x,y)$ from the degraded image $I(x,y)$ for restoration of the image $L(x,y)$. The former is referred to as "non-blind deconvolution", and the latter is referred to as "blind deconvolution". In the case of the blind deconvolution, it is necessary to estimate both $PSF(x,y)$ and the image L from the degraded image I. Therefore, reduction of blur is difficult as compared with the non-blind deconvolution.

The convolution of a PSF that defines blur caused by camera shake (camera shake blur) is realized by a linear filter. The linear filter of the two-dimensional convolution is typically expressed by a kernel that is formed by a coefficient matrix that has a size of N×N pixels. Here, N is an integer not less than 3. The PSF that defines the blur can be expressed by a blur kernel. To process an image that has blur into a restored image in which the blur is reduced (including an image from which the blur is eliminated), it is necessary to estimate a blur kernel that defines the blur.

Non-patent Document 1 discloses using a multi-scale inference scheme in estimating a blur kernel and a restored image from a single image that has blur. In this multi-scale inference scheme, a low-resolution degraded image is first used to estimate a blur kernel that has a size of 3×3 pixels. Then, the resolution of the degraded image used for the estimation is gradually increased, whereby the resolution of the blur kernel is increased. FIGS. 13(a) to 13(h) are diagrams for illustrating the scheme disclosed in Non-patent Document 1. The upper part of FIG. 13(a) shows a blur kernel of 3×3 pixels, and the lower part shows a restored image of a corresponding resolution. The same applies to FIGS. 13(b) to 13(h), although with gradually increasing resolutions.

The low-resolution degraded image has a small pixel count, and accordingly, the pixel size of the camera shake blur is small. As a result, in the low-resolution degraded image, the size of the blur kernel is smaller, and accordingly, the amount of computation that is necessary for estimation of the blur kernel is smaller. If estimation of the blur kernel is started with a high-resolution degraded image that has a larger pixel count, there is a probability that convergence to a blur kernel that is different from a true blur kernel (local minima) may occur. According to the multi-scale inference scheme, the estimation accuracy of the blur kernel can be improved.

In order to estimate a blur kernel K which has a size of M×M pixels (size M) with the use of a blur kernel K which has a size of N×N pixels (size N) where M is an integer greater than N, it is necessary to enlarge the blur kernel K (size N) by a factor of M/N. Also, it is necessary to prepare a degraded image obtained by enlarging the pixel size of the degraded image used in estimation of the blur kernel K (size N) by a factor of M/N in terms of either of the vertical and horizontal dimensions. Based on the thus-enlarged degraded image, the blur kernel K (size M) is estimated from that degraded image. The blur kernel K (size M) that is used as the initial value in this estimation can be obtained by enlarging the blur kernel K (size N) that has a smaller size.

CITATION LIST

Patent Literature

Patent Document 1: Japanese Laid-Open Patent Publication No. 2006-129236
Patent Document 2: Japanese PCT National Phase Laid-Open Publication No. 2009-522825

Non-Patent Literature

Non-patent Document 1: Rob Fergus et al., "Removing camera shake from a single image", Barun Singh Aaron Hertzmann, SIGGRAPH 2006

SUMMARY OF INVENTION

Technical Problem

The above-described enlargement of the blur kernel has been conventionally realized by using a method that is similar to an image expansion method. For example, the enlargement may be realized by spline interpolation or linear interpolation. However, when these methods are used in enlarging the blur kernel, the coefficient matrix of the blur kernel is subjected to interpolation as in the case of the pixel value of an image, so that a coefficient matrix that represents the trajectory of the camera shake can be enlarged into an inappropriate coefficient matrix. This leads to problems that the time is consumed by estimation of the blur kernel and image restoration and that obtaining a correct blur kernel is difficult.

The present invention was conceived for the purpose of solving the above problems. One of the objects of the present invention is to provide an image processing device and an image processing method in which a blur kernel is appropriately enlarged in estimation of a blur kernel and a restored image while the resolution is increased using the multi-scale inference scheme.

Another object of the present invention is to provide an image capture device that includes the above-described image processing device.

Solution to Problem

An image processing device of the present invention is an image processing device for processing a degraded image that has camera shake blur into a restored image in which the blur is reduced, including: a contracted image generation section for generating a plurality of contracted degraded images that have different resolutions from a resolution of an input degraded image; a kernel estimation section configured to receive from the contracted image generation section the contracted degraded images that have the different resolutions and sequentially perform estimation of a blur kernel that defines camera shake blur in an increasing order of resolution based on the contracted degraded images, thereby generating a blur kernel that has a resolution corresponding to a resolution of each of the contracted degraded images; and a kernel enlargement section configured to receive the blur kernel generated by the kernel estimation section and increases a resolution of the received blur kernel, thereby generating an initial value of a blur kernel that has a higher resolution than the resolution of the received blur kernel, wherein when performing estimation of a blur kernel based on a contracted degraded image that has a first resolution, the kernel estimation section performs the estimation based on an initial value of a blur kernel that has a resolution corresponding to the first resolution, and thereafter, when performing estimation of a blur kernel based on a contracted degraded image that has a second resolution that is higher than the first resolution, the kernel estimation section performs the estimation based on an initial value of a blur kernel that has a resolution corresponding to the second resolution, and the kernel enlargement section extracts interest points of a blur kernel received from the kernel estimation section, performs an enlargement transformation on coordinates of the interest points, and connects new interest points obtained by performing the enlargement transformation on the coordinates of the interest points, thereby generating an initial value of a blur kernel that has an increased resolution.

In a preferred embodiment, the kernel enlargement section includes an interest point extraction section for extracting the interest points of the blur kernel received from the kernel estimation section, a coordinate transformation section for performing the enlargement transformation on the coordinates of the interest points, and an interest point connecting section for connecting the new interest points obtained by the enlargement transformation.

In a preferred embodiment, the interest point extraction section extracts as the interest points, from the blur kernel received from the kernel estimation section, a corner point in a corner portion of a sequence of non-zero coefficients and a leading end point and a trailing end point of the non-zero coefficient sequence.

In a preferred embodiment, when three pixels corresponding to three adjoining coefficients of the non-zero coefficient sequence of the blur kernel received from the kernel estimation section are in a non-straight arrangement, the interest point extraction section determines one of the three pixels residing at a center of the three pixels as the corner point.

An image capture device of the present invention is an image capture device including: an image sensor that includes a plurality of photosensitive cells arrayed over an imaging area; an optical system for forming an image on the imaging area; and an image processing section for processing a signal obtained from the image sensor, wherein the image processing section is realized by the above-described image processing device.

An image processing method of the present invention is an image processing method for processing a degraded image that has camera shake blur into a restored image in which the blur is reduced, including the steps of: (A) generating a first contracted degraded image that has a first resolution that is lower than a resolution of an input degraded image; (B) estimating a blur kernel that defines camera shake blur based on the first contracted degraded image, thereby generating a first blur kernel that has a resolution corresponding to the resolution of the first contracted degraded image; (C) generating a second contracted degraded image that has a second resolution that is higher than the first resolution; (D) generating an initial value of a second blur kernel that has a resolution corresponding to the second resolution based on the first blur kernel; and (E) estimating a blur kernel that defines camera shake blur based on the second contracted degraded image and the initial value of the second blur kernel, thereby performing estimation of the second blur kernel that has the resolution corresponding to the second resolution, wherein step (D) includes (d1) extracting interest points of the first blur kernel, (d2) performing an enlargement transformation on coordinates of the interest points, and (d3) connecting new interest points that have the transformed coordinates.

Advantageous Effects of Invention

According to the present invention, the estimation process is repeated while gradually increasing the resolution of a degraded image that is used as the subject of restoration and the resolution of a blur kernel that is to be estimated. Therefore, a high-resolution blur kernel can be accurately estimated at the end, and restoration of an image can be completed. Further, according to the present invention, when the resolution of a blur kernel is increased, the coordinate transformation of the interest points and line segment connection are performed. Therefore, appropriate coefficients can be set for the blur kernel without setting unnecessary coefficients by interpolation that would be performed in the prior art image expansion method. Therefore, such a problem in the prior art that deterioration of the estimation accuracy is caused due to an error in enlargement of a blur kernel can be solved.

BRIEF DESCRIPTION OF DRAWINGS

FIG. 1(a) is a diagram showing an example of a blur kernel that has a size of 3×3 pixels. FIG. 1(b) is a diagram showing an example of the arrangement of pixel values in an unblurred image.

FIG. 2A is a diagram showing a convolution result for the pixel at position (x,y)=(2,2) in the image of FIG. 1(b).

FIG. 2B is a diagram showing a convolution result for the pixel at position (x,y)=(2,3) in the image of FIG. 1(b).

DESCRIPTION OF EMBODIMENTS

Figure 3:
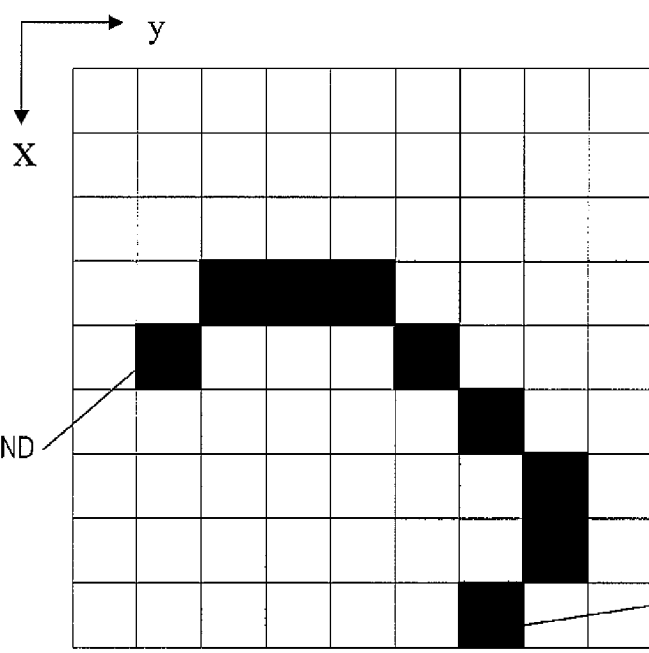
FIG. 3(a) is a diagram showing an example of the coefficient matrix of a blur kernel of 9×9 pixels.
FIG. 3(b) is a diagram where, among the coefficients shown in FIG. 3(a), the elements that have non-zero values are represented by black boxes and the elements that have zero values are represented by white boxes.

An image processing device of the present invention is an image processing device for processing a degraded image that has camera shake blur into a restored image in which the blur is reduced. This device includes a contracted image generation section for generating a contracted degraded image that has a different resolution from that of an input degraded image. In this contracted image generation section, based on a degraded image obtained by image capturing, a low-resolution image can be obtained which has a smaller pixel count than the degraded image. For example, when the pixel size of an input image is X×Y pixels, the input image can be contracted to an image that has a pixel size of X'×Y' pixels in any proportion. Here, X, Y, X', and Y' are integers which meet X>X' and Y>Y'. Note that, in this specification, the meaning of the "resolution" of an image is equivalent to the "pixel count" or "pixel size" of the image. Therefore, as the pixel count is increased by a factor of 2, the resolution is also increased by a factor of 2.

The image processing device of the present invention includes a kernel estimation section for estimating a blur kernel that defines camera shake blur. This kernel estimation section sequentially receives contracted degraded images of different resolutions from the contracted image generation section and performs estimation of a blur kernel that defines camera shake blur using the multi-scale inference scheme. More specifically, while gradually increasing the resolution of a contracted degraded image used for estimation of a blur kernel, the resolution of a blur kernel obtained by the estimation is also gradually increased. Here, blur kernels that have resolutions corresponding to the resolutions of the respective contracted degraded images are sequentially generated. Here, the resolutions of the blur kernels corresponding to the resolutions of the contracted degraded images mean that the contraction ratio of the blur kernel is substantially equal to the contraction ratio of the contracted degraded image. That is, the ratio of the resolution at a certain level relative to the resolution of a blur kernel that is finally estimated (contraction ratio) is substantially equal to the ratio of the resolution of a contracted degraded image at a certain level relative to the resolution of a degraded image obtained by photographing (contraction ratio).

Next, the blur kernel is described in more detail with reference to FIG. 1.

FIG. 1(a) shows an example of a blur kernel that has a size of 3×3 pixels. This blur kernel defines an example of blur in the case where a camera moves in a horizontal direction by the distance of three pixels due to camera shake during exposure. FIG. 1(b) is a diagram showing an example of the arrangement of pixel values in an unblurred image. This image has a size of 5×5 pixels. A set of 25 values shown in FIG. 1(b) is an example of the brightness values of the pixels that constitute the image.

When camera shake blur that is expressed by the blur kernel shown in FIG. 1(a) occurs, a blurred image is obtained by performing a two-dimensional convolution with the blur kernel of FIG. 1(b) on the image of FIG. 1(b).

An image I obtained by photographing (degraded image) is expressed by Formula 2:

[Expression 2]

$$I = K * L + N \quad \text{(Formula 2)}$$

where K is the blur kernel, L is an original image, and N is noise.

FIG. 2A shows a convolution result for the pixel at position (x,y)=(2,2) in the image of FIG. 1(b). This operation is performed on the pixel values of 3×3 pixels (=9 pixels) in a rectangular region enclosed by broken lines in the image on the left side of FIG. 2A. Three elements out of the nine coefficients of the blur kernel have values of 0.2, 0.4, and 0.4, while the other six elements have zero values. When a convolution is performed using this blur kernel, the pixel values at the positions (2,1), (2,2), and (2,3) in the image are multiplied by the coefficients of 0.2, 0.4, and 0.4, respectively, and the sum of the products is calculated. The resultant value is 18×0.2+19×0.4+21×0.4=19.6. This value is stored at position (2,2) as the pixel value obtained by the operation.

FIG. 2B is a diagram showing a convolution result for the pixel at position (x,y)=(2,3) in the image of FIG. 1(b). This operation is performed on the pixel values of 3×3 pixels=9 pixels in a rectangular region enclosed by broken lines in the image on the left side of FIG. 2B. When a convolution is performed using the blur kernel, the pixel values at the positions (2,2), (2,3), and (2,4) in the image are multiplied by the coefficients of 0.2, 0.4, and 0.4, respectively, and the sum of the products is calculated. The resultant value is 19×0.2+21×0.4+18×0.4=19.4. This value is stored at position (2,3) as the pixel value obtained by the operation.

The above-described calculation is performed on pixel values of an image with a given resolution (a given pixel count) while the center position of the blur kernel is shifted, whereby an image obtained by the convolution, i.e., an image that has camera shake blur (degraded image), is determined.

In order to process a degraded image into a restored image that has no blur, it is necessary to estimate a coefficient matrix of a blur kernel which is a cause of degradation. If the blur kernel is estimated, an image before degradation (restored image) can be obtained by deconvolution.

FIG. 3(a) shows an example of the coefficient matrix of a blur kernel of 9×9 pixels. This coefficient matrix is normalized such that the sum of non-zero coefficients is equal to 1. FIG. 3(b) is a diagram where, among the coefficients shown in FIG. 3(a), the elements that have non-zero values are represented by black boxes and the elements that have zero values are represented by white boxes. The set of the black elements in FIG. 3(b) corresponds to the trajectory of the camera shake. The set of the black elements in FIG. 3(b) has a varying pattern according to the trajectory of the camera shake during the exposure.

Since camera shake occurs due to a motion of a camera during the exposure, the trajectory of the camera shake is formed by a straight line or a curve extending from the leading end point to the trailing end point. As shown in FIG. 3(b), in the camera shake trajectory which is expressed by a blur kernel of a finite size, a "curve" included in part of the trajectory can be obtained by connecting two pixels by a straight line.

The image processing device of the present invention includes a kernel enlargement section for forming a high-resolution blur kernel that has a relatively large size from a low-resolution blur kernel that has a relatively small size. This kernel enlargement section receives a blur kernel generated by the kernel estimation section and increases the resolution of the received blur kernel, thereby generating the initial value of a blur kernel that has a higher resolution than the resolution of the received blur kernel.

Figure 4:
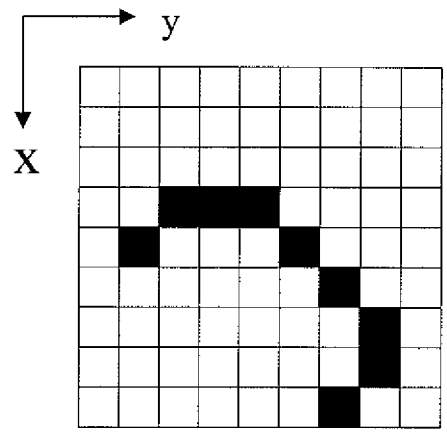
FIG. 4(a) is a diagram showing a blur kernel of 9×9 pixels.
FIG. 4(b) is a diagram showing a result of enlargement of the blur kernel of FIG. 4(a) to the size of 18×18 pixels according to an image expansion method.
Figure 4:
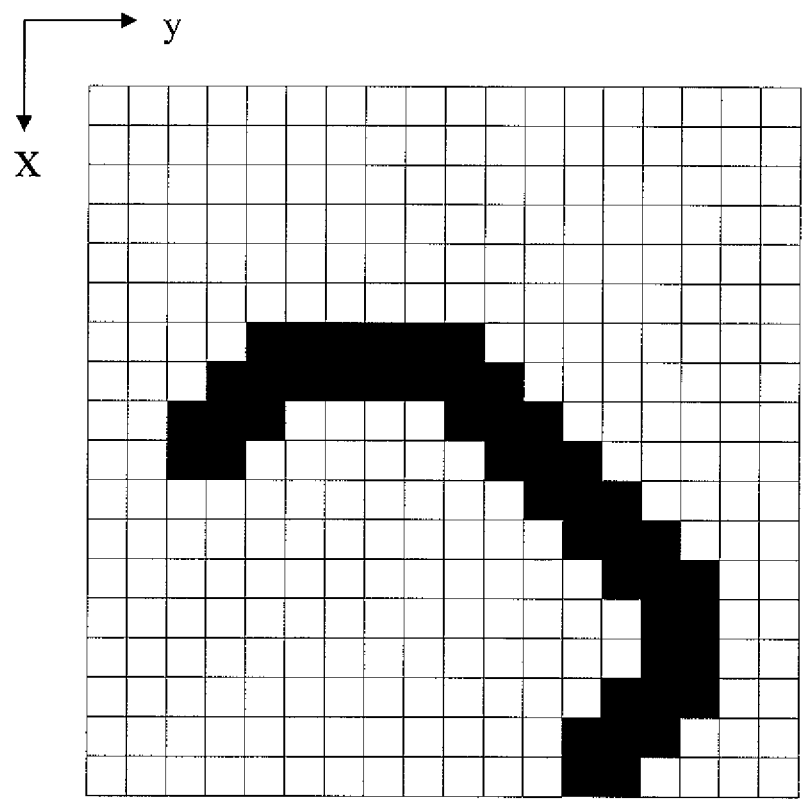
Figure 5:
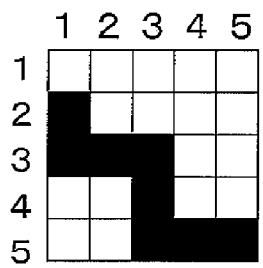
FIGS. 5(a) to 5(d) show an example where a blur kernel of 5×5 pixels is enlarged to obtain a blur kernel of 6×6 pixels.
Figure 5:
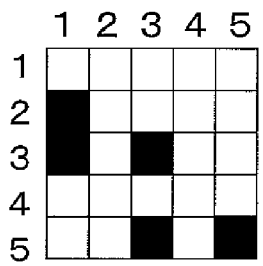
Figure 5:
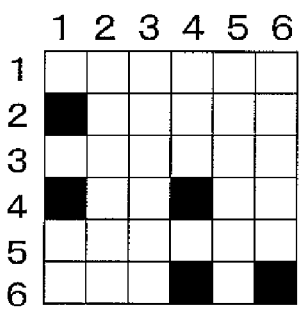
Figure 5:
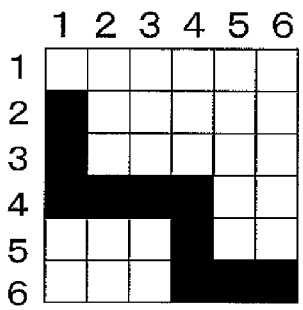

In the prior art, enlargement of a blur kernel is realized by a known image expansion method, such as spline interpolation or linear interpolation. Simply enlarging a blur kernel using such an expansion method results in a coefficient matrix which is inappropriate for a blur kernel that represents camera shake blur. For example, when a blur kernel of 9×9 pixels shown in FIG. 4(a) is expanded to the size of 18×18 pixels using an image expansion method, the number of coefficients which have non-zero values (black elements) increases as shown in FIG. 4(b). In expanding an image, it is necessary to interpolate pixel values so as to obtain a smooth expanded image. However, as a result, the camera shake trajectory disadvantageously becomes broader.

According to the present invention, to remove such a disadvantage, the size of the blur kernel is increased according to a method that will be described below. Here, an example where a blur kernel of 5×5 pixels is enlarged to obtain a blur kernel of 6×6 pixels is described with reference to FIGS. 5(a) to 5(d).

Suppose that a blur kernel shown in FIG. 5(a) is first obtained. From a train of elements of this blur kernel which have non-zero coefficients (black elements), interest points that specify the camera shake trajectory are extracted. Here, the interest points include "leading end point", "trailing end point", and "corner point". Whether or not a black element is a corner point can be determined according to, for example, whether or not the angle formed by two tangents extending from an element of interest to opposite sides is equal to or greater than 45°. In the example of FIG. 5(a), the leading end point and the trailing end point are the elements of position (2,1) and position (5,5), respectively. The corner points are at positions (3,1), (3,3), and (5,3). In this example, the corner angle at either of the corner points is 90°.

A coordinate transformation for enlargement is performed on the coordinates of the interest points extracted as described above. In this example, the coordinates of the interest points are multiplied by 6/5(=1.2), and the fractional parts are rounded off. The new coordinates of the leading end point and the trailing end point which are obtained after the coordinate transformation are (2,1) and (6,6), respectively. The new coordinates of the corner points after the coordinate transformation are (4,1), (4,4), and (6,4), respectively. In FIG. 5(c), the elements at the positions of the interest points after the coordinate transformation are represented by black boxes.

Then, the interest points, which have once been connected before the coordinate transformation, are again connected by straight lines. Here, elements which are penetrated by a straight line extending between two positions are provided with non-zero coefficients. FIG. 5(d) shows a pattern of the camera shake trajectory in the enlarged blur kernel. The number of black elements shown in FIG. 5(d) is 10. This is greater than the number of black elements before the enlargement (FIG. 5(a)), i.e., 8, but the breadth of the line corresponding to the trajectory is not increased. That is, unnecessary interpolation is not provided, so that the resultant blur kernel is closer to the trajectory of the camera shake.

In the present embodiment, the blur kernel is normalized such that the sum of the coefficients is 1. Thus, the numerical values assigned to the black elements shown in FIG. 5(d) are calculated such that the sum of the numerical values is 1. The coefficients after the enlargement may be determined such that, after the enlargement, the sum of the coefficients of the elements (pixels) penetrated by a straight line extending between two interest points is equal to what it was before the enlargement. Now, suppose that, for example, before the enlargement, there are two elements (pixels) penetrated by a straight line extending between two corner points, and the coefficients of the two elements are 0.14 and 0.16. Here, the sum of the two coefficient values is 0.3. In the case where the number of elements (pixels) penetrated by a straight line extending between two corresponding corner points is increased to three after the enlargement, the coefficients of 0.3/3(=0.1) can be assigned to the three elements. Note that, however, the method of determining the coefficients of a blur kernel after the enlargement is not limited to this example.

Thus, according to a preferred embodiment of the present invention, when the kernel estimation section estimates a blur kernel based on a contracted degraded image which has the first resolution, the estimation is performed based on the initial value of a blur kernel which has a resolution corresponding to the first resolution. When the kernel estimation section estimates a blur kernel based on a contracted degraded image which has the second resolution that is higher than the first resolution, the estimation is performed based on the initial value of a blur kernel which has a resolution corresponding to the second resolution. This kernel enlargement section identifies the interest points of a blur kernel received from the kernel estimation section and connects interest points obtained by an enlargement transformation of the coordinates of the identified interest points, whereby the resolution of the blur kernel is improved.

Figure 6:
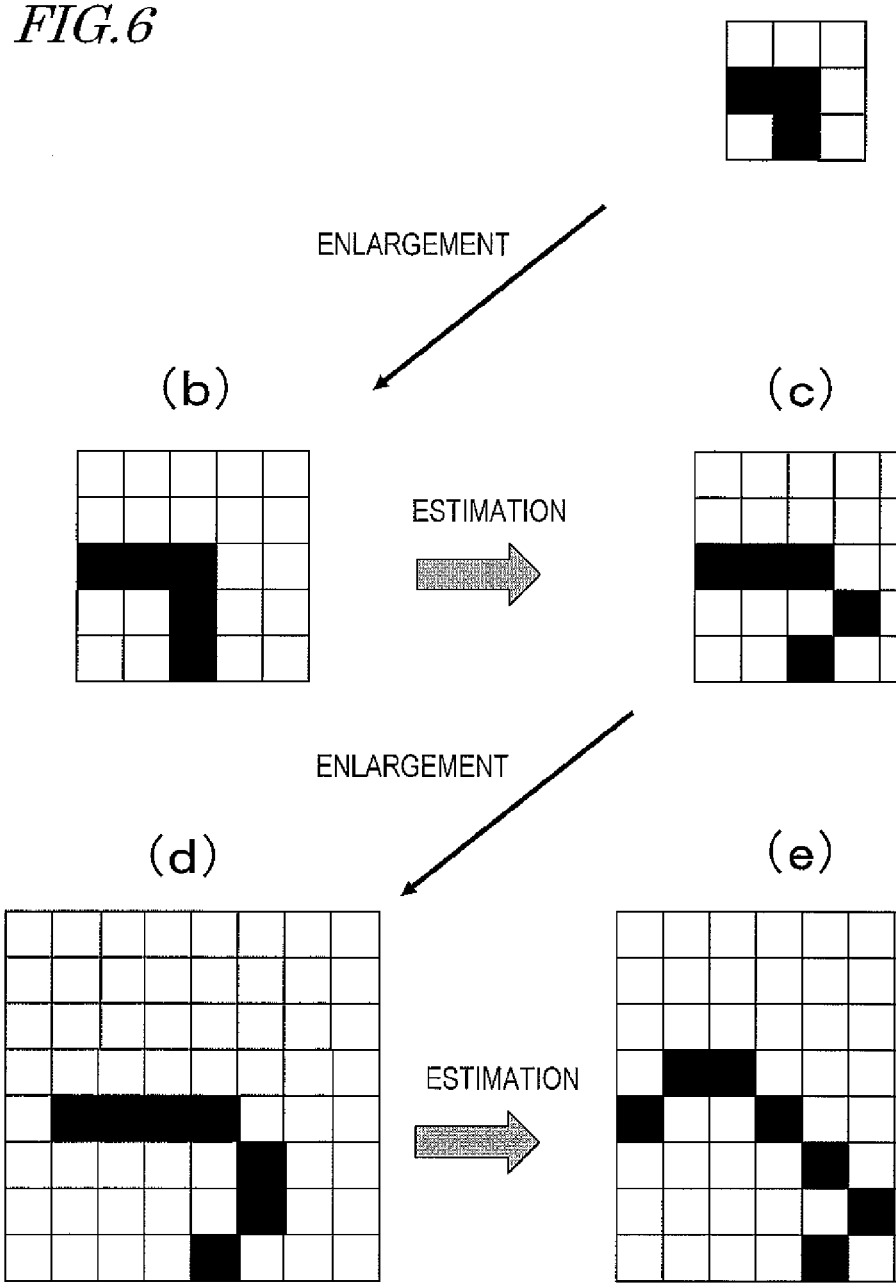
FIG. 6 illustrates a general concept of a hierarchal blur kernel estimation method used in the present embodiment.

Next, a hierarchal blur kernel estimation method will be described with reference to FIG. 6.

First, the size of a final blur kernel (final size) and the size of an initial blur kernel (initial size) are set according to the pixel size of an image (degraded image) obtained by photographing. For example, the final size is set to 20×20 pixels, and the initial size is set to 3×3 pixels. In this example, the horizontal size of the blur kernel is increased from 3 pixels to 20 pixels. In this case, the ratio of horizontal enlargement, H, is 20/3. Meanwhile, the vertical size of the blur kernel is also increased from 3 pixels to 20 pixels, so that the ratio of vertical enlargement, V, is also 20/3.

In the above example, a blur kernel which has a size of 3×3 pixels repeatedly undergoes the estimation with its pixel count being gradually increased, and in the end, estimation of a blur kernel which has a size of 20×20 pixels is performed. Here, the size of the contracted degraded image used in estimation of the blur kernel is also increased in proportion to the size of the blur kernel. Hereinafter, this aspect will be described.

First, generation of the smallest contracted degraded image that is used in the first turn is described. This contracted degraded image can be obtained by contracting a degraded image obtained by photographing, by the ratio H in the horizontal dimension and by the ratio V in the vertical dimension. If, for example, the horizontal size of the degraded image obtained by photographing is 4000 pixels and the vertical size is 2000 pixels, the horizontal size is contracted to 4000/H pixels, and the vertical size is contracted to 2000/V pixels. As described above, if H=V=20/3, the horizontal size is 4000/H=4000×3/20=600 pixels, and the vertical size is 2000/V=2000×3/20=300 pixels. In this way, a contracted degraded image of 600×300 pixels, for example, is prepared.

Then, after the initial value of the blur kernel of 3×3 pixels is set, a blur kernel of 3×3 pixels is estimated using a known blind deconvolution method based on that initial value and a contracted degraded image of 600×200 pixels, and a restored image of 600×200 pixels is generated. The blur kernel of 3×3 pixels which is set at the start is arbitrary. The initial value of this blur kernel may be set to a fixed value or may be manually or automatically selected from a plurality of initial value candidates.

FIG. 6(b) schematically shows an example of a blur kernel which is estimated based on the first-provided contracted degraded image, i.e., the contracted degraded image of the lowest resolution. In the shown blur kernel, among the 3×3 pixels, three black elements have coefficients of non-zero values, and six white elements have coefficients of zero values. The coefficients of the black elements have specific values, although not shown, and are normalized such that the sum of the specific values is equal to 1.

Then, enlargement of the thus-obtained blur kernel is performed. FIG. 6(b) shows an example of an enlarged blur kernel. In this example, the blur kernel of 3×3 pixels is enlarged by a factor of 5/3 in either of the vertical and horizontal dimensions using the method which has previously been described with reference to FIG. 5, whereby a blur kernel of 5×5 pixels (FIG. 6(b)) is generated.

Then, the contracted degraded image used in the estimation of the blur kernel of 3×3 pixels is enlarged by a factor of 5/3 in either of the vertical and horizontal dimensions, whereby an enlarged contracted degraded image is prepared. For example, if an image of 600×300 pixels is enlarged by a factor of 5/3 in either of the vertical and horizontal dimensions, the resultant image has the size of 1000×500 pixels. The contracted degraded image of such a size may be generated by contracting a degraded image of 4000×2000 pixels which is obtained by photographing. Alternatively, it may be generated by enlarging an image of 600×300 pixels which is obtained by a restoration process. Such contraction and enlargement of an image may be realized by using a known image contraction/expansion method. Note that, in this specification, images which have a smaller pixel count than the image obtained by photographing (degraded image) are all referred to as "contracted degraded image".

Then, estimation of a blur kernel is performed using the blur kernel of FIG. 6(b) as the initial value, and using a contracted degraded image which has a resolution corresponding to the size of 5×5 pixels (in the above example, the size of 1000×500 pixels). This estimation is performed using a known blind deconvolution method. FIG. 6(c) shows an example of the thus-estimated blur kernel. Meanwhile, a restored image of 1000×500 pixels is also generated.

Then, an enlargement process is performed in the same way, whereby a blur kernel shown as an example in FIG. 6(d) is obtained. Then, a contracted degraded image which has a size corresponding to the size of this blur kernel is generated. Then, the blur kernel of FIG. 6(d) is used as the initial value, and a blur kernel is estimated from a contracted degraded image which has a size corresponding to this initial value. An example of the estimated blur kernel is shown in FIG. 6(e). The increase of the resolution may be realized by increasing the pixel size by a constant ratio (e.g., 5/3). However, the present invention is not limited to such a case.

Estimation and enlargement of a blur kernel are repeated in this way, and when estimation of a blur kernel which has the final size is completed, a restored image of the final size is obtained.

Next, a configuration example of an embodiment of the image capture device of the present invention is described.

Figure 7:
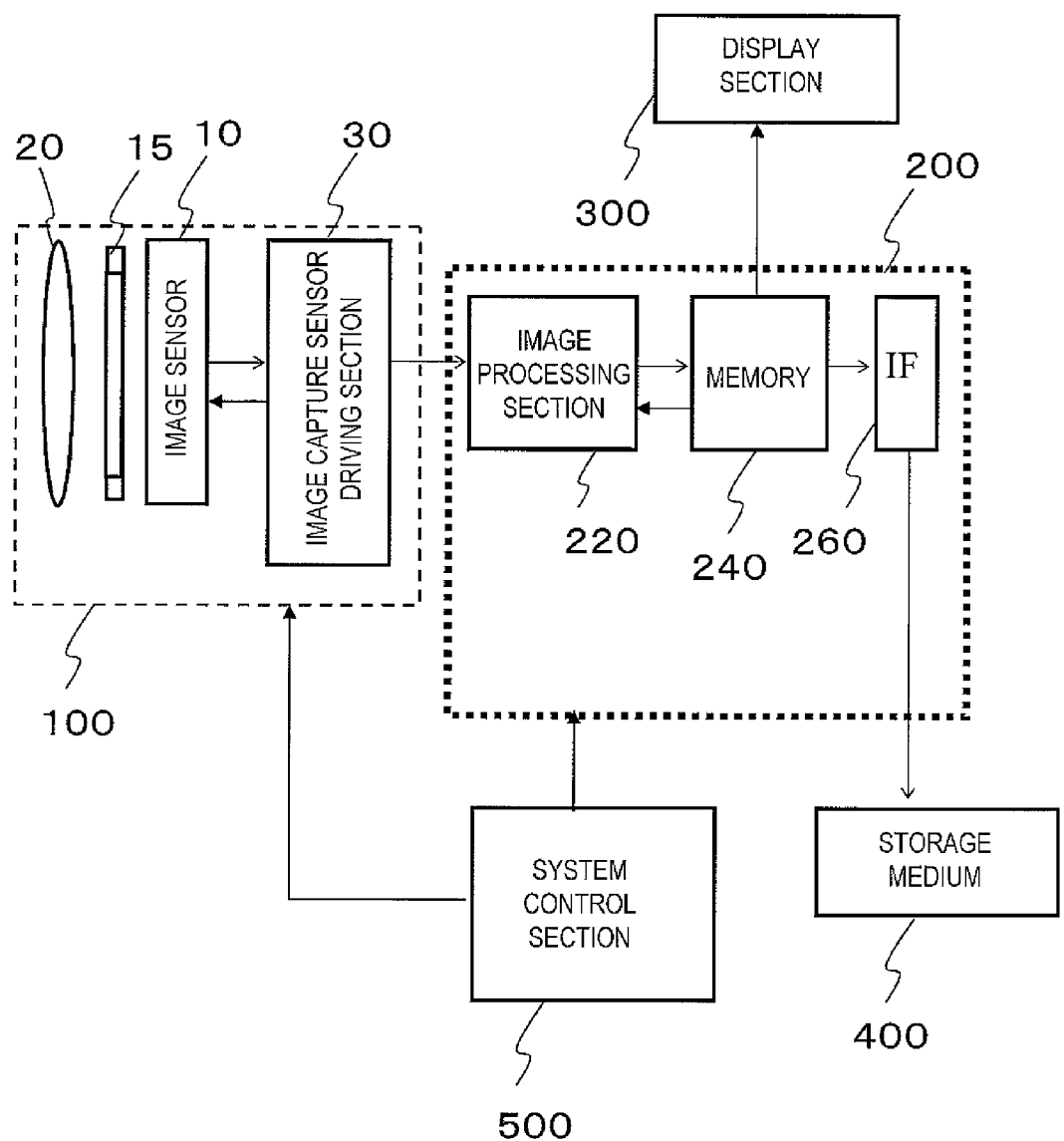
FIG. 7 is a block diagram showing a general configuration of the image capture device of the present embodiment.

FIG. 7 is a block diagram showing a general configuration of the image capture device of the present embodiment.

The image capture device of the present embodiment is a digital electronic camera. The image capture device includes an image capture section 100, a signal processing section 200 for performing various signal processing, a captured image display section 300 for displaying an image obtained by image capturing, a storage medium 400 for storing data of the image, and a system control section 500 for controlling respective sections. A major difference of the image capture device of the present embodiment from known image capture devices resides in the operation of the signal processing section 200. Therefore, in the descriptions provided below, the signal processing section 200 is mainly described in detail.

The image capture section 100 of the present embodiment includes an image sensor (image sensor) 10 that has a plurality of photosensitive cells (photodiodes) arranged over an imaging area, a shutter 15 which has the function of a lens stop, and a photography lens 20 for forming an image on the imaging area of the image sensor 10. A typical example of the image capture device 10 is a CCD or a CMOS sensor. The photography lens 20 of the present embodiment has a known configuration and may be, in actuality, a lens unit which is formed by a plurality of lenses. The shutter 15 and the photography lens 20 are driven by an unshown mechanism to perform operations which are necessary for optical zooming, Auto Exposure (AE) and Auto Focus (AF).

The image capture section 100 further includes an image sensor driving section 30 for driving the image sensor 10. The image sensor driving section 30 may be realized by, for example, an LSI, such as a CCD driver. The image sensor driving section 30 drives the image sensor 10 to read out an analog signal from the image sensor 10 and convert the analog signal to a digital signal.

The signal processing section 200 of the present embodiment includes an image processing section (image processor) 220, a memory 240, and an interface (IF) section 260. The signal processing section 200 is coupled to a display section 300, such as a liquid crystal display panel, and a storage medium 400, such as a memory card. The storage medium is detachable.

The image processing section 220 performs various signal processing required for the operation, such as color tone correction, change of resolution, auto exposure, auto focusing, and data compression, as well as the inventive restoration process on a degraded image. The image processing section 220 is preferably realized by a combination of hardware, such as a known digital signal processor (DSP), and software for execution of image processing that includes the image restoration process of the present invention. The memory 240 may be formed by a DRAM or the like. The memory 240 stores image data obtained from the image capture section 100 and, meanwhile, temporarily stores image data which have undergone various image processing or image data which have been compressed in the image processing section 220. These image data are converted to analog signals and thereafter displayed in the display section 300. Alternatively, the image data which remain in the form of digital signals are stored in the storage medium 400 via the interface section 260.

The above components are controlled by the system control section 500 that includes an unshown central processing unit (CPU) and a flash memory. Note that the image capture apparatus of the present embodiment may include other known components, such as a viewfinder, a power source (battery), and a flashlight. However, descriptions of such components are not particularly necessary for understanding of the present invention and are therefore omitted.

Next, the configuration of the image capture section 100 is described with reference to FIG. 8 and FIG. 9.

Figure 8:
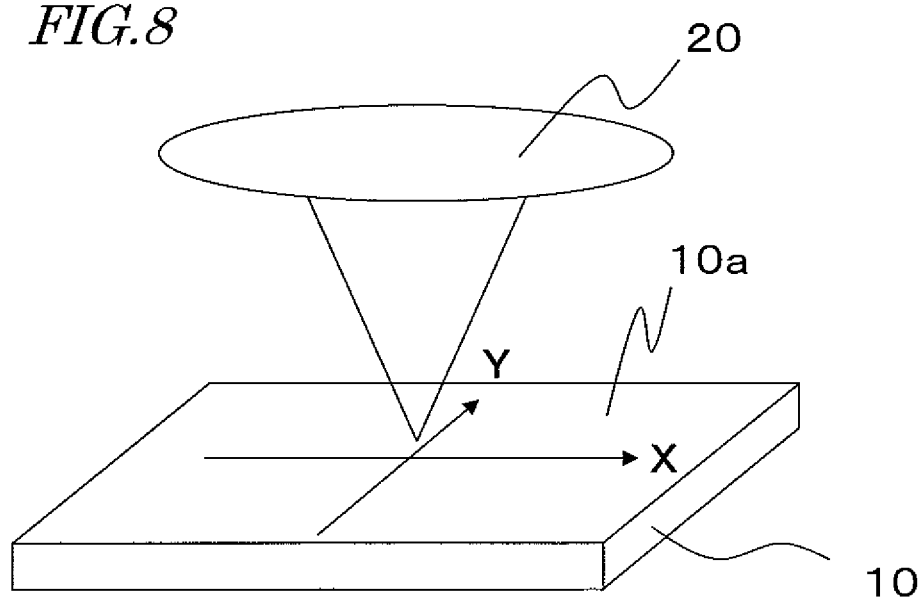
FIG. 8 is a diagram schematically showing a general configuration of an image sensor 10 and a photography lens 20 in the image capture section 100.
Figure 9:
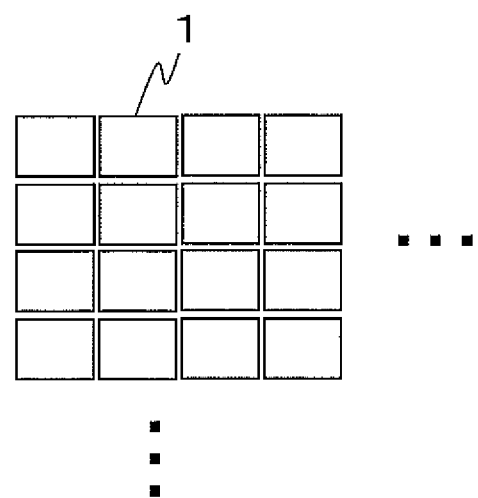
FIG. 9 is a schematic top view of an imaging area 10a of the image sensor 10.

FIG. 8 schematically shows a general configuration of the image sensor 10 and the lens 20 of the image capture section 100. The image sensor 10 of FIG. 7 has an imaging area 10a. There are a plurality of photosensitive cells arrayed over the imaging area 10a. FIG. 9 is a schematic top view of the imaging area 10a. In this example, the photosensitive cells 1 are arrayed in rows and columns. The arrangement of the photosensitive cells 1 is not limited to the shown example. The planar shape of each of the photosensitive cells is not limited to square. To generate color image signals, typically, primary color filters or complementary color filters are provided over respective ones of the photosensitive cells 1. Note that, however, a configuration of three image sensors may be adopted in which light is separated into rays of three colors RGB, for example, and the light rays of the respective colors are received by different ones of the image sensors.

Next, a configuration example of the image processing section 220 is described with reference to FIG. 10 and FIG. 11.

Figure 10:
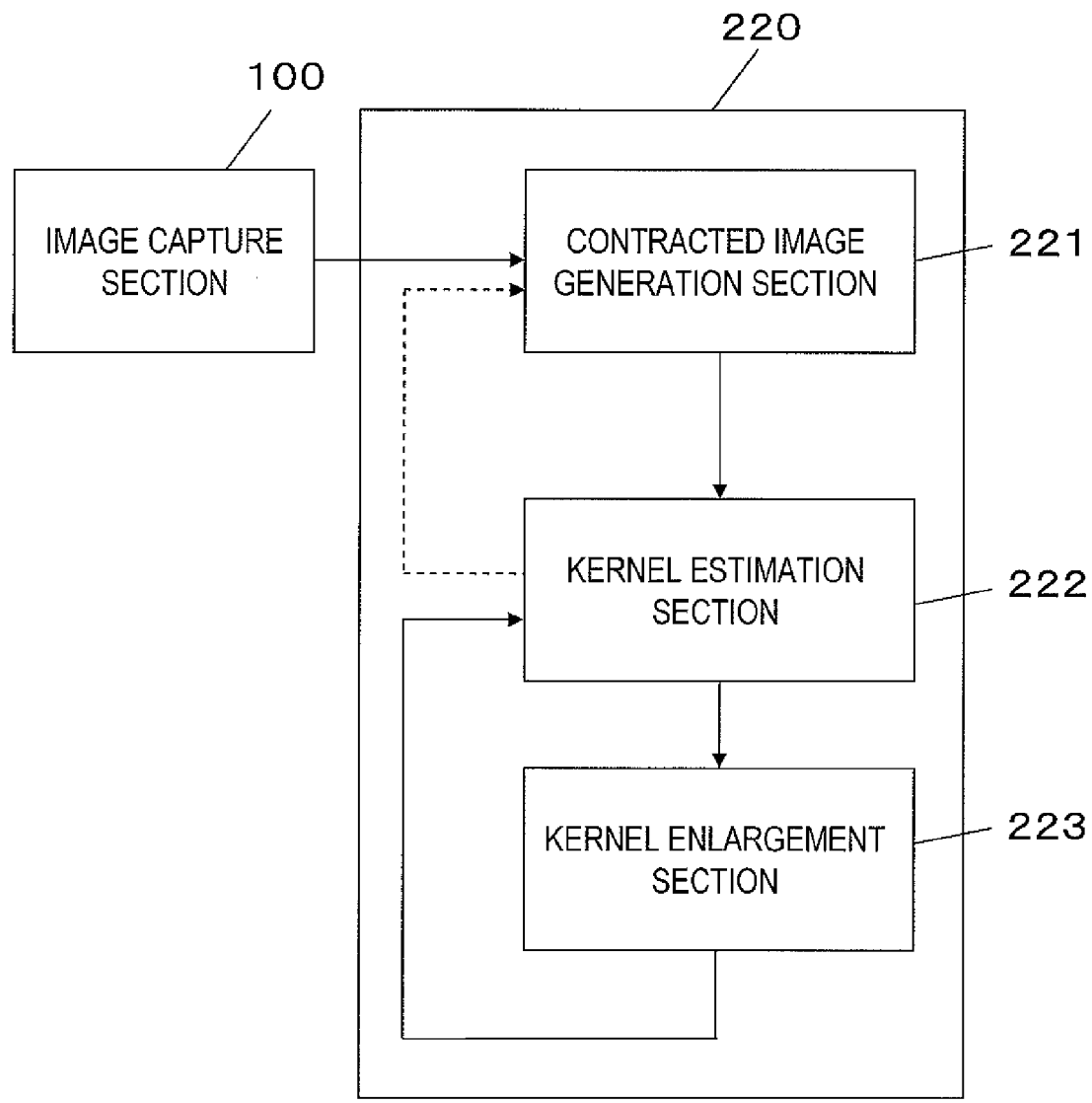
FIG. 10 is a block diagram showing a configuration example of an image processing section 220 shown in FIG. 7.

As shown in FIG. 10, the image processing section 220 of the present embodiment includes a contracted image generation section 221 which is configured to receive an image signal from the image capture section 100 and generate a contracted image, a kernel estimation section 222 for estimating a blur kernel based on the contracted degraded image, and a kernel enlargement section 223 for enlarging the estimated blur kernel such that the resolution of the blur kernel is increased.

Figure 11:
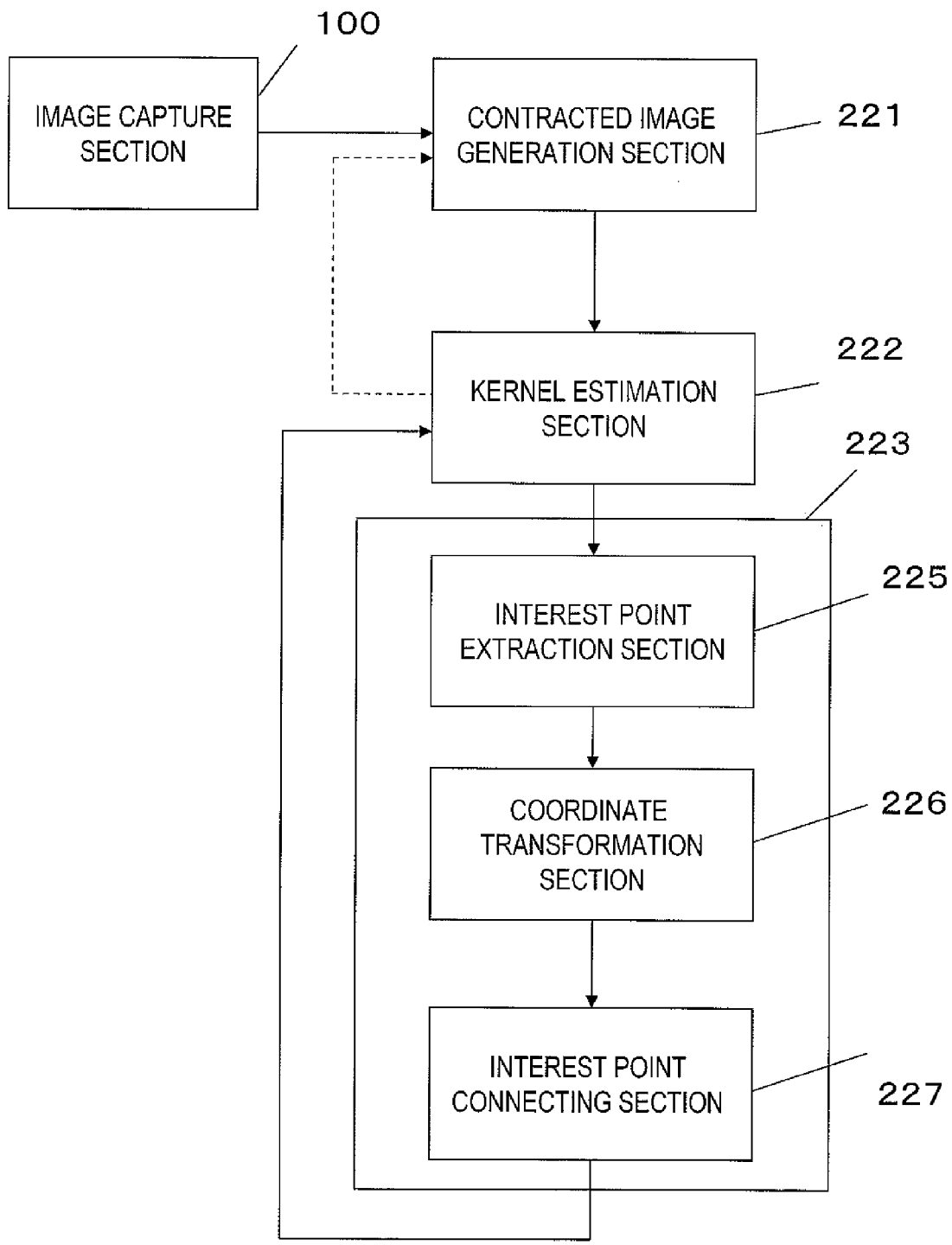
FIG. 11 is a block diagram showing a configuration example of a kernel enlargement section 223 of the image processing section 220.

FIG. 11 is a diagram showing the configuration of the kernel enlargement section 223 in more detail. As shown in FIG. 11, this kernel enlargement section 223 includes an interest point extraction section 225 for extracting interest points of a blur kernel received from the kernel estimation section 222, a coordinate transformation section 226 for performing an enlargement transformation on the coordinates of the interest points, and an interest point connecting section 227 for connecting the transformed interest points to generate a blur kernel of an increased resolution (initial value of estimation).

The contracted image generation section 221, the kernel estimation section 222, and/or the kernel enlargement section 223 may preferably be realized by a combination of known hardware and software that instructs the hardware to execute the operation of the present embodiment. However, part or all of various operations in the present invention, for example, various processes including generation of a contracted degraded image, estimation of a blur kernel, extraction of interest points, enlargement transformation of interest point coordinates, connection of interest points, etc., may be realized by a special-purpose integrated circuit that is manufactured for these purposes.

Figure 12:
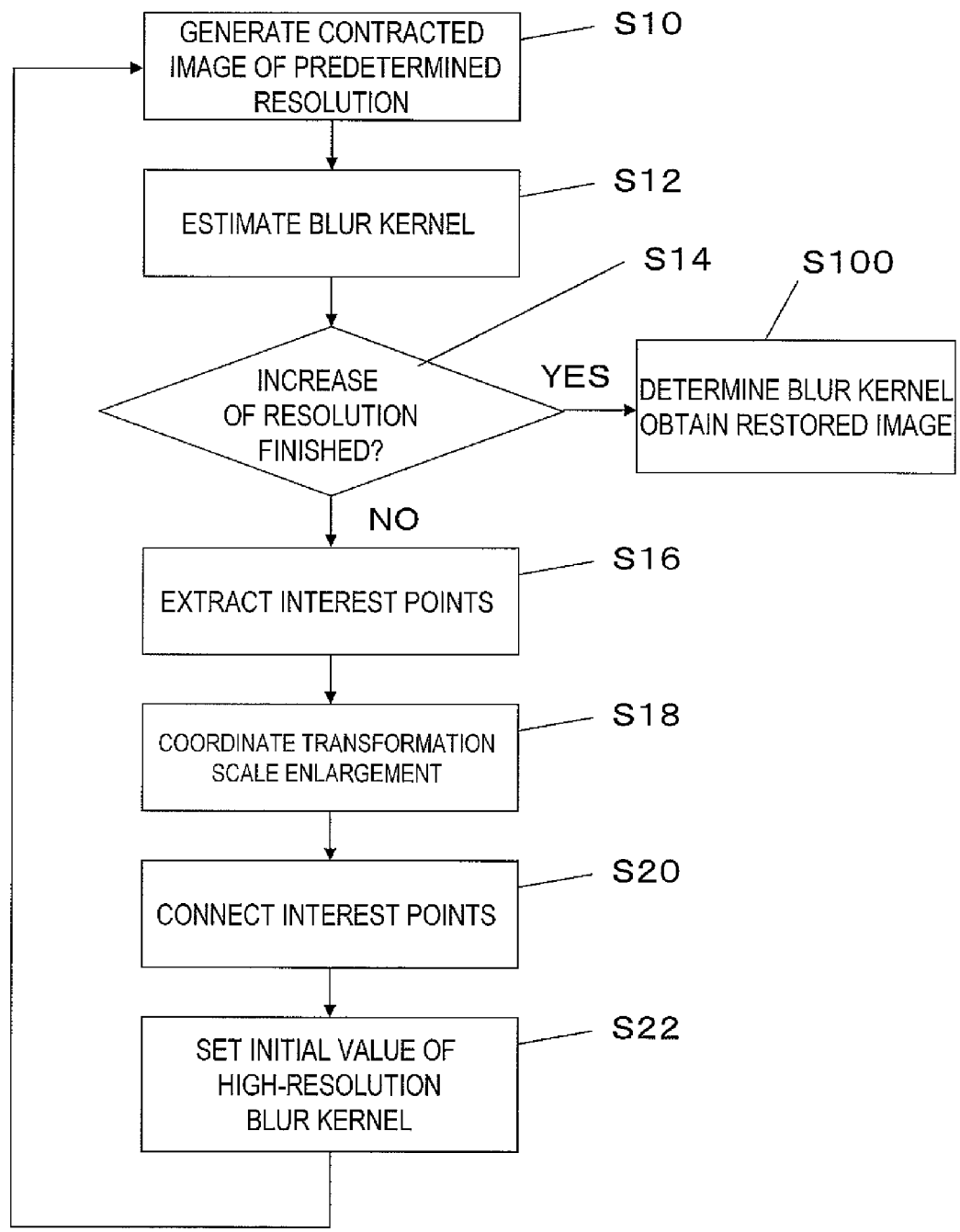
FIG. 12 is a flowchart showing an example of a restoration process performed in an embodiment of the present invention.
Figure 13:
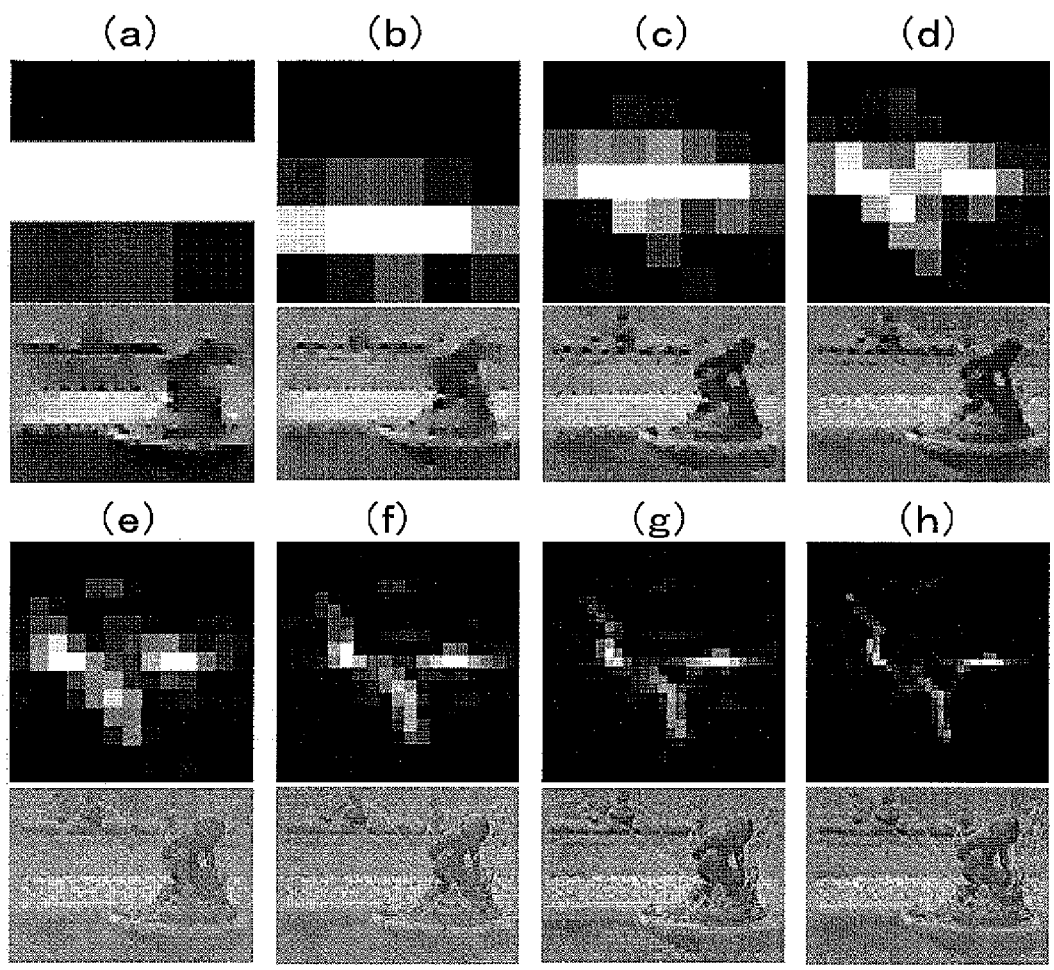
FIGS. 13(a) to 13(h) are diagrams for illustrating the scheme disclosed in Non-patent Document 1.

Next, the operation of the present embodiment is described with reference to FIG. 12.

First, in step S10, a contracted image that has a predetermined resolution is generated. Here, the predetermined resolution may be determined based on, for example, the ratio of the size of the final blur kernel (final size) to the size of the initial blur kernel (initial size) as described above. Specifically, if this ratio (final size:initial size) is H:1 in the horizontal dimension and V:1 in the vertical dimension, a degraded image obtained by photographing is contracted such that the pixel count is decreased by 1/H in the horizontal dimension and by 1/V in the vertical dimension.

Then, in step S12, a blur kernel is estimated from a blur kernel of the initial size and the contracted degraded image. In step S14, it is determined whether or not the resolution has been increased to the final level (whether or not increase of the resolution is necessary). If the final resolution level is not reached (NO), the process advances to step S16. In step S16, interest points are extracted from the blur kernel obtained in step S12.

Then, in step S18, an enlargement transformation is performed on the coordinates of the interest points (scale enlargement). In step S20, an enlarged blur kernel is generated by connecting the transformed coordinates. The thus-obtained blur kernel is assigned as the initial blur kernel that is used for estimating a blur kernel from an enlarged image in step S22.

Thereafter, the process returns to step S10 for generating a contracted degraded image which has a higher resolution than the contracted degraded image which has been used in the previous kernel estimation. Thereafter, the above-described procedure is repeated.

In step S14, it is determined whether or not increase of the resolution has been finished. If finished (YES), the process advances to step S100. In step S100, an image can be obtained which is restored using the finally-obtained blur kernel.

According to the above-described method, a low-resolution degraded image is used as the subject of restoration at the start, and therefore, a blur kernel which has a small size can be efficiently estimated. And, the estimation process is repeated while the resolution of a degraded image which is used for the estimation and the resolution of a blur kernel which is to be estimated are gradually increased. Thus, at the end, a high-resolution blur kernel can be accurately estimated without falling in local minima, and image restoration can be completed. Further, according to a preferred embodiment of the present invention, when the resolution of a blur kernel is increased, the coordinate transformation of the interest' points and connection of the interest points are performed. Therefore, more appropriate coefficients can be set for the blur kernel without setting unnecessary coefficients by interpolation.

INDUSTRIAL APPLICABILITY

An image capture device of the present invention is capable of processing a high-resolution degraded image into a restored image with high accuracy by means of image processing. Therefore, the present invention provides high industrial applicability when adopted in an image capture device that can produce blur due to camera shake. Both a PSF and a restored image can be estimated even under the condition that the PSF is unknown, and therefore, an image that has reduced blur can be obtained without a special camera shake preventing mechanism or with the use of such a camera shake preventing mechanism.

The image processing device of the present invention does not need to be incorporated in the image capture device and may be configured to receive data of an image obtained by an image capture device and process the received data.

REFERENCE SIGNS LIST 10 image sensor
20 photography lens
15 shutter with lens stop function
30 image sensor driving section
100 image capture section
200 signal processing section
220 image processing section
222 kernel estimation section
223 kernel enlargement section
225 interest point extraction section
226 coordinate transformation section
227 interest point connecting section
240 memory
260 interface (IF)
300 display section
400 storage medium
500 system control section

The invention claimed is:

1. An image processing device that processes a degraded image that has camera shake blur into a restored image in which the blur is reduced, comprising:
a contracted image generation section that generates a plurality of contracted degraded images that have different resolutions from a resolution of an input degraded image;
a kernel estimation section configured to receive from the contracted image generation section the contracted degraded images that have the different resolutions and sequentially perform estimation of a blur kernel that defines camera shake blur in an increasing order of resolution based on the contracted degraded images, thereby generating a blur kernel that has a resolution corresponding to a resolution of each of the contracted degraded images; and
a kernel enlargement section configured to receive the blur kernel generated by the kernel estimation section and increases a resolution of the received blur kernel, thereby generating an initial value of a blur kernel that has a higher resolution than the resolution of the received blur kernel,
wherein when performing estimation of a blur kernel based on a contracted degraded image that has a first resolution, the kernel estimation section performs the estimation based on an initial value of a blur kernel that has a resolution corresponding to the first resolution, and thereafter, when performing estimation of a blur kernel based on a contracted degraded image that has a second resolution that is higher than the first resolution, the kernel estimation section performs the estimation based on an initial value of a blur kernel that has a resolution corresponding to the second resolution, and
the kernel enlargement section extracts interest points of a blur kernel received from the kernel estimation section, performs an enlargement transformation on coordinates of the interest points, and connects new interest points obtained by performing the enlargement transformation on the coordinates of the interest points, thereby generating an initial value of a blur kernel that has an increased resolution, and
wherein the kernel enlargement section provides elements of the enlarged blur kernel that are penetrated by a straight line extending between two interest points with non-zero coefficients, and provides the other elements of the enlarged blur kernel with zero coefficients.

2. The image processing device of claim 1, wherein the kernel enlargement section includes
an interest point extraction section for extracting the interest points of the blur kernel received from the kernel estimation section,
a coordinate transformation section for performing the enlargement transformation on the coordinates of the interest points, and
an interest point connecting section for connecting the new interest points obtained by the enlargement transformation.

3. The image processing device of claim 2, wherein the interest point extraction section extracts as the interest points, from the blur kernel received from the kernel estimation section, a corner point in a corner portion of a sequence of non-zero coefficients and a leading end point and a trailing end point of the non-zero coefficient sequence.

4. The image processing device of claim 3 wherein, when three pixels corresponding to three adjoining coefficients of the non-zero coefficient sequence of the blur kernel received from the kernel estimation section are in a non-straight arrangement, the interest point extraction section determines one of the three pixels residing at a center of the three pixels as the corner point.

5. An image capture device, comprising:
- an image sensor that includes a plurality of photosensitive cells arrayed over an imaging area;
- an optical system for forming an image on the imaging area; and
- an image processing section for processing a signal obtained from the image sensor,
- wherein the image processing section is realized by the image processing device of claim 1.

6. An image processing method for processing a degraded image that has camera shake blur into a restored image in which the blur is reduced, comprising the steps of:
- (A) generating a first contracted degraded image that has a first resolution that is lower than a resolution of an input degraded image;
- (B) estimating a blur kernel that defines camera shake blur based on the first contracted degraded image, thereby generating a first blur kernel that has a resolution corresponding to the resolution of the first contracted degraded image;
- (C) generating a second contracted degraded image that has a second resolution that is higher than the first resolution;
- (D) generating an initial value of a second blur kernel that has a resolution corresponding to the second resolution based on the first blur kernel; and
- (E) estimating a blur kernel that defines camera shake blur based on the second contracted degraded image and the initial value of the second blur kernel, thereby performing estimation of the second blur kernel that has the resolution corresponding to the second resolution, wherein step (D) includes
- (d1) extracting interest points of the first blur kernel,
- (d2) performing an enlargement transformation on coordinates of the interest points, and
- (d3) connecting new interest points that have the transformed coordinates, and wherein elements of the enlarged blur kernel that are penetrated by a straight line extending between two interest points are provided with non-zero coefficients, and the other elements of the enlarged blur kernel are provided with zero coefficients.

* * * * *